US011917239B2

(12) United States Patent
Xu et al.

(10) Patent No.: US 11,917,239 B2
(45) Date of Patent: Feb. 27, 2024

(54) METHOD, APPARATUS AND SYSTEM FOR PLAYING MEDIA DATA, AND DEVICE AND STORAGE MEDIUM

(71) Applicant: TENCENT MUSIC ENTERTAINMENT TECHNOLOGY (SHENZHEN) CO., LTD., Shenzhen (CN)

(72) Inventors: Haojie Xu, Shenzhen (CN); Ge Tang, Shenzhen (CN); Shuo Zhao, Shenzhen (CN); Xiaozhen Ji, Shenzhen (CN)

(73) Assignee: TENCENT MUSIC ENTERTAINMENT TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/764,910

(22) PCT Filed: Sep. 28, 2020

(86) PCT No.: PCT/CN2020/118565
§ 371 (c)(1),
(2) Date: Mar. 29, 2022

(87) PCT Pub. No.: WO2021/063326
PCT Pub. Date: Apr. 8, 2021

(65) Prior Publication Data
US 2022/0345774 A1 Oct. 27, 2022

(30) Foreign Application Priority Data
Sep. 30, 2019 (CN) .......................... 201910944391.5

(51) Int. Cl.
*H04N 21/439* (2011.01)
*H04N 21/2387* (2011.01)
(Continued)

(52) U.S. Cl.
CPC ..... *H04N 21/4394* (2013.01); *H04N 21/2387* (2013.01); *H04N 21/25875* (2013.01); *H04N 21/4108* (2013.01)

(58) Field of Classification Search
CPC ........... H04N 21/4394; H04N 21/2387; H04N 21/25875; H04N 21/4108
See application file for complete search history.

(56) References Cited

U.S. PATENT DOCUMENTS 7,134,145 B1 11/2006 Epstein
2015/0113332 A1 4/2015 Fu
(Continued)

FOREIGN PATENT DOCUMENTS

CN 1201940 A 12/1998
CN 103425572 A 12/2013
(Continued)

OTHER PUBLICATIONS

International Search Report of the International Searching Authority for State Intellectual Property Office of the People's Republic of China in PCT application No. PCT/CN2020/118565 dated Dec. 31, 2020, which is an International application corresponding to this U.S. application.

(Continued)

*Primary Examiner* — Yassin Alata
(74) *Attorney, Agent, or Firm* — Kolitch Romano Dascenzo Gates LLC

(57) ABSTRACT

Provided is a method for playing media data. The method includes: receiving a trigger instruction; generating a second count value based on a stored first count value and a preset algorithm, and storing the second count value to overwrite the first count value, wherein the second count value is different from the first count value; generating audio data carrying a pre-stored authority identifier and the second (Continued)

count value; and playing the audio data, wherein the audio data is configured to instruct a second terminal to acquire the authority identifier and the second count value carried in the audio data, and send the authority identifier and the second count value to a server, and the second terminal is a terminal that has received the audio data.

14 Claims, 9 Drawing Sheets

(51) Int. Cl.
*H04N 21/258* (2011.01)
*H04N 21/41* (2011.01)

(56) References Cited

U.S. PATENT DOCUMENTS

| | | | |
|---|---|---|---|
| 2015/0186658 A1 | 7/2015 | Marien | |
| 2015/0373024 A1 | 12/2015 | Zhang et al. | |
| 2019/0172076 A1* | 6/2019 | Wirasinghe | H04N 21/8549 |
| 2021/0312033 A1* | 10/2021 | Kirkeby | G06Q 30/0185 |

FOREIGN PATENT DOCUMENTS

| | | |
|---|---|---|
| CN | 103634109 A | 3/2014 |
| CN | 104902016 A | 9/2015 |
| CN | 105872626 A | 8/2016 |
| CN | 106411501 A | 2/2017 |
| CN | 106534053 A | 3/2017 |
| CN | 106993201 A | 7/2017 |
| CN | 107517179 A | 12/2017 |
| CN | 108540481 A | 9/2018 |
| JP | 2003522349 A | 7/2003 |
| JP | 2012221274 A | 11/2012 |
| JP | 2017021810 A | 1/2017 |
| JP | 2017505048 A | 2/2017 |
| KR | 20130104357 A | 9/2013 |

OTHER PUBLICATIONS

The State Intellectual Property Office of People's Republic of China, First Office Action in Patent Application No. CN201910944391.5 dated Nov. 23, 2021, which is a foreign counterpart application corresponding to this U.S. Patent Application, to which this application claims priority.

Notice of Reasons for Refusal of Japanese Application No. 2022-519730 dated May 30, 2023.

Notice of Office Action of Korean Application No. 10-2022-7013664 dated May 30, 2023.

* cited by examiner

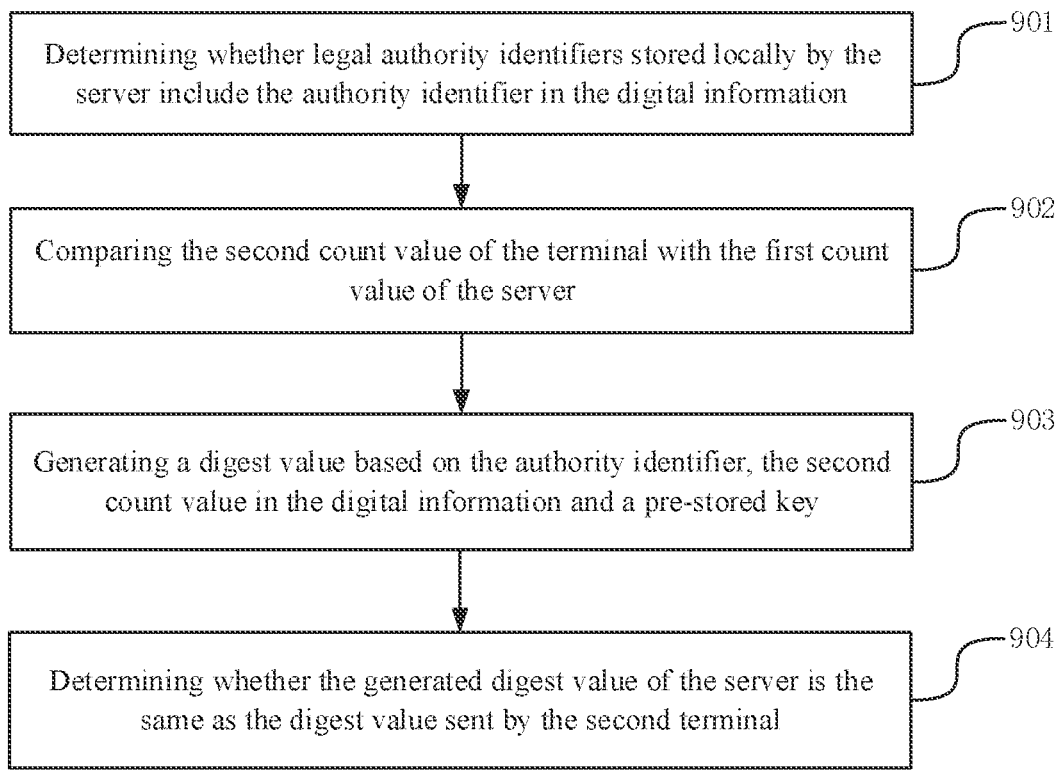

| Authority identifier | Key | Playback address of digital album | Bound account |

FIG. 8

901 Determining whether legal authority identifiers stored locally by the server include the authority identifier in the digital information 902 Comparing the second count value of the terminal with the first count value of the server 903 Generating a digest value based on the authority identifier, the second count value in the digital information and a pre-stored key 904 Determining whether the generated digest value of the server is the same as the digest value sent by the second terminal

FIG. 9

METHOD, APPARATUS AND SYSTEM FOR PLAYING MEDIA DATA, AND DEVICE AND STORAGE MEDIUM

CROSS-REFERENCE TO RELATED APPLICATION

This application is a US national stage of international application No. PCT/CN2020/118565, filed on Sep. 28, 2020, which claims priority of the Chinese Patent Application No. 201910944391.5, filed on Sep. 30, 2019 and entitled "METHOD, APPARATUS AND SYSTEM FOR PLAYING MEDIA DATA, AND DEVICE AND STORAGE MEDIUM," the contents of which are incorporated herein by reference in their entireties.

TECHNICAL FIELD

The present disclosure relates to the field of computer technologies, and in particular relates to a method, apparatus and system for playing media data, and a device and a storage medium.

BACKGROUND

Nowadays, listening to songs is important entertainment in people's lives. To listen to songs, people used to buy physical albums. However, with the development of the Internet, instead of buying physical albums, people usually buy digital albums.

A user acquires a digital album by purchasing a peripheral card corresponding to the digital album, and the peripheral card may be regarded as a miniature audio playback device. With the peripheral card, the user play audio data stored therein. The audio data carries identification information of the peripheral card. A terminal captures the audio data played by the peripheral card, converts the audio data into digital information and sends the digital information to the server. The server verifies the identification information carried in the received digital information, and in the case that the verification is successful, the server sends a permission notification of playing this album to the terminal.

SUMMARY

Embodiments of the present disclosure provide a method, apparatus and system for playing media data, and an device and a storage medium, which solves the problem of album piracy. The technical solutions of the present disclosure are as follows.

In one aspect, a method for playing media data is provided. The method is applicable to a first terminal, and includes:

receiving a trigger instruction;

generating a second count value based on a stored first count value and a preset algorithm, and storing the second count value to overwrite the first count value, wherein the second count value is different from the first count value;

generating audio data carrying a pre-stored authority identifier and the second count value; and playing the audio data, wherein the audio data is configured to instruct a second terminal to acquire the authority identifier and the second count value carried in the audio data, and send the authority identifier and the second count value to a server, and the second terminal is a terminal that has received the audio data.

Optionally, generating the audio data carrying the pre-stored authority identifier and the second count value includes:

generating a digest value based on a pre-stored authority identifier, the second count value, and a pre-stored key; and generating audio data carrying the authority identifier, the second count value, and the digest value.

Optionally, generating the audio data carrying the authority identifier, the second count value, and the digest value includes:

randomly sorting the digest value, the second count value, and the authority identifier, and generating corresponding sequence information; and generating audio data carrying the sequence information and the randomly sorted digest value, the second count value, and the authority identifier.

Optionally, generating the second count value based on the stored first count value and the preset algorithm includes:

generating the second count value by adding a preset increment value to the stored first count value.

In another aspect, a method for playing media data is provided. The method is applicable to a second terminal, and includes:

receiving audio data played by a first terminal;

acquiring digital information carried in the audio data, wherein the digital information includes an authority identifier and a second count value;

sending the digital information to a server; and receiving a playback address of the media data from the server, and playing the media data based on the playback address.

In still another aspect, a method for playing media data is provided. The method is applicable to a server, and includes:

receiving digital information from a second terminal, wherein the digital information includes an authority identifier and a second count value;

acquiring a playback address of media data corresponding to the authority identifier pre-stored locally and replacing a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally; and sending the playback address of the media data corresponding to the authority identifier to the second terminal.

Optionally, the digital information further includes a digest value, and prior to acquiring the playback address of media data corresponding to the authority identifier pre-stored locally and replacing the first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally, the method further includes:

generating a digest value based on the authority identifier, the second count value in the digital information, and a pre-stored key; and determining that the generated digest value is the same as the digest value in the digital information.

Optionally, the digital information further includes sequence information configured to record a sequence of the authority identifier, the second count value, and the digest value in the digital information, and prior generating the digest value based on the authority identifier, the second count value in the digital information, and the pre-stored key, the method further includes:

acquiring the authority identifier, the second count value, and the digest value in the digital information based on the sequence information.

Optionally, that the second count value satisfies a preset condition with respect to the first count value corresponding to the authority identifier stored locally includes: the second count value being greater than the first count value.

In yet still another aspect, an apparatus for playing media data is provided. The apparatus is applicable to a first terminal, and includes:

a receiving module, configured to receive a trigger instruction;

a counting module, configured to generate a second count value based on a stored first count value and a preset algorithm, and store the second count value to overwrite the first count value, wherein the second count value is different from the first count value;

a generating module, configured to generate audio data carrying a pre-stored authority identifier and the second count value; and a sending module, configured to play the audio data, wherein the audio data is configured to instruct a second terminal to acquire the authority identifier and the second count value carried in the audio data, and send the authority identifier and the second count value to a server, and the second terminal is a terminal that has received the audio data.

Optionally, the generating module is configured to:

generate a digest value based on a pre-stored authority identifier, the second count value, and a pre-stored key; and generate audio data carrying the authority identifier, the second count value, and the digest value.

Optionally, the generating module is configured to:

randomly sort the digest value, the second count value, and the authority identifier, and generate corresponding sequence information; and generate audio data carrying the sequence information and the randomly sorted digest value, the second count value, and the authority identifier.

Optionally, the counting module is configured to:

generate the second count value by adding a preset increment value to the stored first count value.

In yet still another aspect, an apparatus for playing media data is provided. The apparatus is applicable to a second terminal, and includes:

a receiving module, configured to receive audio data played by a first terminal;

an acquiring module, configured to acquire digital information carried in the audio data, wherein the digital information includes an authority identifier and a second count value;

a sending module, configured to send the digital information to a server; and a playing module, configured to receive a playback address of the media data from the server, and play the media data based on the playback address.

In yet still another aspect, an apparatus for playing media data is provided. The apparatus is applicable to a server, and includes:

a receiving module, configured to receive digital information from a second terminal, wherein the digital information includes an authority identifier and a second count value;

an acquiring module, configured to acquire a playback address of media data corresponding to the authority identifier pre-stored locally and replace a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally; and a sending module, configured to send the playback address of the media data corresponding to the authority identifier to the second terminal.

Optionally, the digital information further includes a digest value, and the apparatus further includes:

a generating module, configured to generate a digest value based on the authority identifier, the second count value in the digital information and a pre-stored key; and a determining module, configured to determine that the generated digest value is the same as the digest value in the digital information.

Optionally, the digital information further includes sequence information, and the acquiring module is further configured to:

acquire the authority identifier, the second count value, and the digest value in the digital information based on the sequence information.

Optionally, that the second count value satisfies a preset condition with respect to the first count value corresponding to the authority identifier stored locally includes: the second count value being greater than the first count value.

In yet still another aspect, a system for playing media data is provided. The system includes a first terminal, a second terminal, and a server.

The first terminal is configured to: receive a trigger instruction; generate a second count value based on a stored first count value and a preset algorithm, and store the second count value to overwrite the first count value, wherein the second count value is different from the first count value; generate audio data carrying a pre-stored authority identifier and the second count value; and play the audio data.

The second terminal is configured to: receive the audio data played by the first terminal; acquire digital information carried in the audio data, wherein the digital information includes the authority identifier and the second count value; send the digital information to the server; and receive a playback address of the media data from the server, and play the media data based on the playback address.

The server is configured to: receive the digital information from the second terminal; acquire a playback address of the media data corresponding to the authority identifier pre-stored locally and replace a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally; and send the playback address of the media data corresponding to the authority identifier to the second terminal.

In yet still another aspect, a computer device is provided. The computer device includes one or more processors and one or more memories, wherein the one or more memories store at least one instruction therein. The at least one instruction, when loaded and executed by the one or more processors, causes the one or more processors to perform operations in the method for playing media data.

In yet still another aspect, a computer-readable storage medium is provided. The storage medium stores at least one instruction, wherein the at least one instruction, when loaded and executed by a processor, causes the processor to perform operations in the method for playing media data.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

FIG. 8 is a schematic diagram of a list in a database of a server in a method for playing media data according to an embodiment of the present disclosure;

FIG. 9 is a flowchart of verifying authority by a server in a method for playing media data according to an embodiment of the present disclosure;

DETAILED DESCRIPTION

Embodiments of the present disclosure are described hereinafter in further detail with reference to the enclosed drawings, to clearly present the objects, technique solutions, and advantages of the present disclosure.

During practice of the present disclosure, the inventors have found that the related art has at least the following problem:

The audio data played by the peripheral card each time is the same, and recording of the audio data may cause the problem of album piracy.

Figure 1:
FIG. 1 is a schematic diagram of an implementation environment according to an embodiment of the present disclosure.

FIG. 1 is a schematic diagram of an implementation environment of a method for playing media data according to an embodiment of the present disclosure. Referring to FIG. 1, an embodiment of the present disclosure provides a method for playing media data. The method may be jointly performed by a first terminal, a second terminal, and a server. The first terminal may have a function of storing data, a function of calculating data, and a function of converting data; the first terminal may have assemblies such as a screen, a switch, and a speaker; and the first terminal may be a peripheral card. The second terminal may have functions of receiving audio and converting data, and may be connected to the Internet. The second terminal may run an application for playing media data, such as an audio and video player. The second terminal may have assemblies such as a display screen, a microphone and a speaker. The second terminal may be a mobile phone, a tablet computer, a smart wearable device, a desktop computer, a notebook computer, or the like. The server may be a background server of the above application, and the server may communicate with the second terminal. The server may be a single server or a server cluster. In the case that the server is a single server, the server may perform all processes that needs to be performed by the server in the following solutions. In the case that the server is a server cluster, different servers in the server cluster may respectively perform different processes in the following solutions. The specific method for allocating the processes may be arbitrarily set by the technical personnel according to actual needs, which is not repeated herein.

In the method for playing media data according to the embodiments of the present disclosure, the same digital album may be acquired based on different audio data generated by the same device. In the embodiments of this application, detailed description is given using a case where the first terminal is a peripheral card, the second terminal is a mobile phone, the application is a music player, and the media data is a digital album as an example, and other situations are similar and are thus not repeated herein. Audio data may be sent from the peripheral card; and the music player may receive the audio data, convert the audio data into digital information, and play digital albums.

Figure 2:
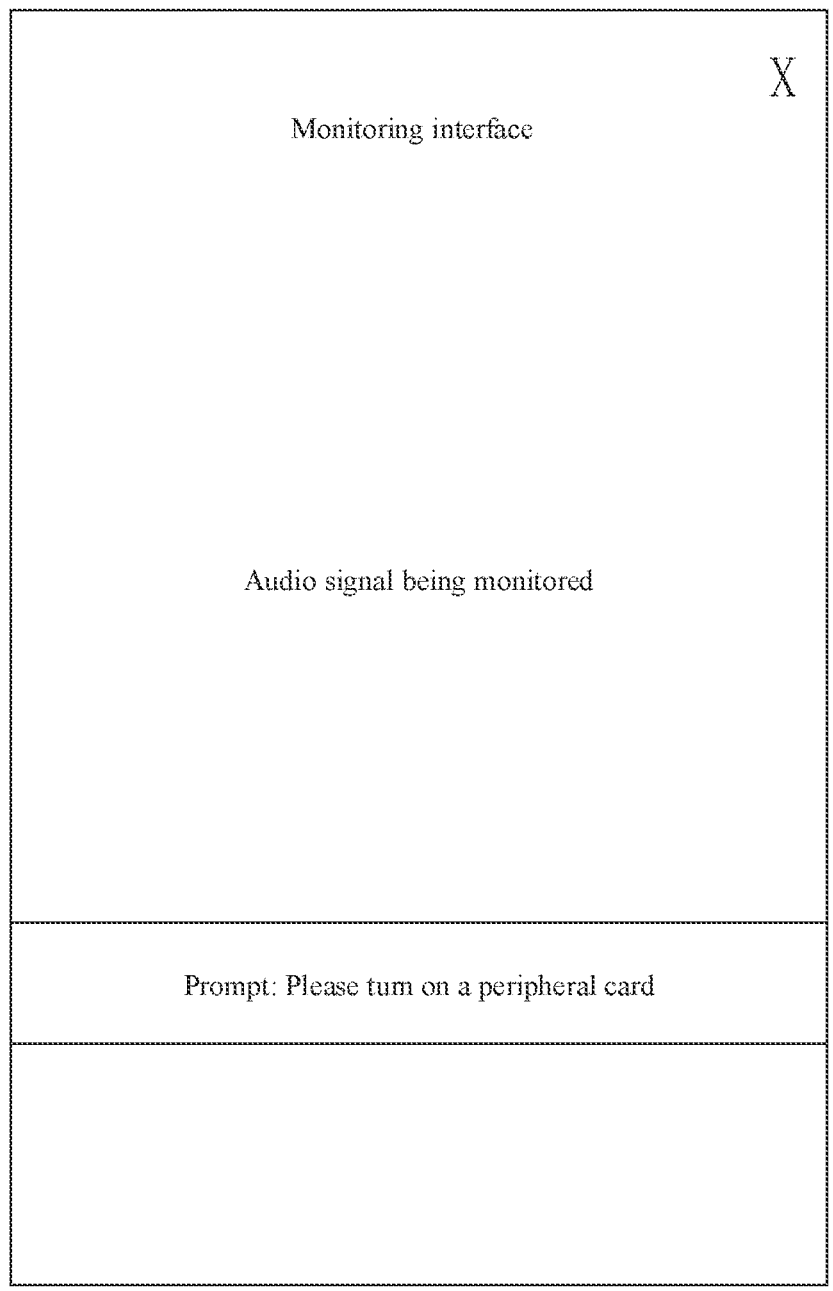
FIG. 2 is a schematic diagram of a monitoring interface according to an embodiment of the present disclosure.
Figure 3:
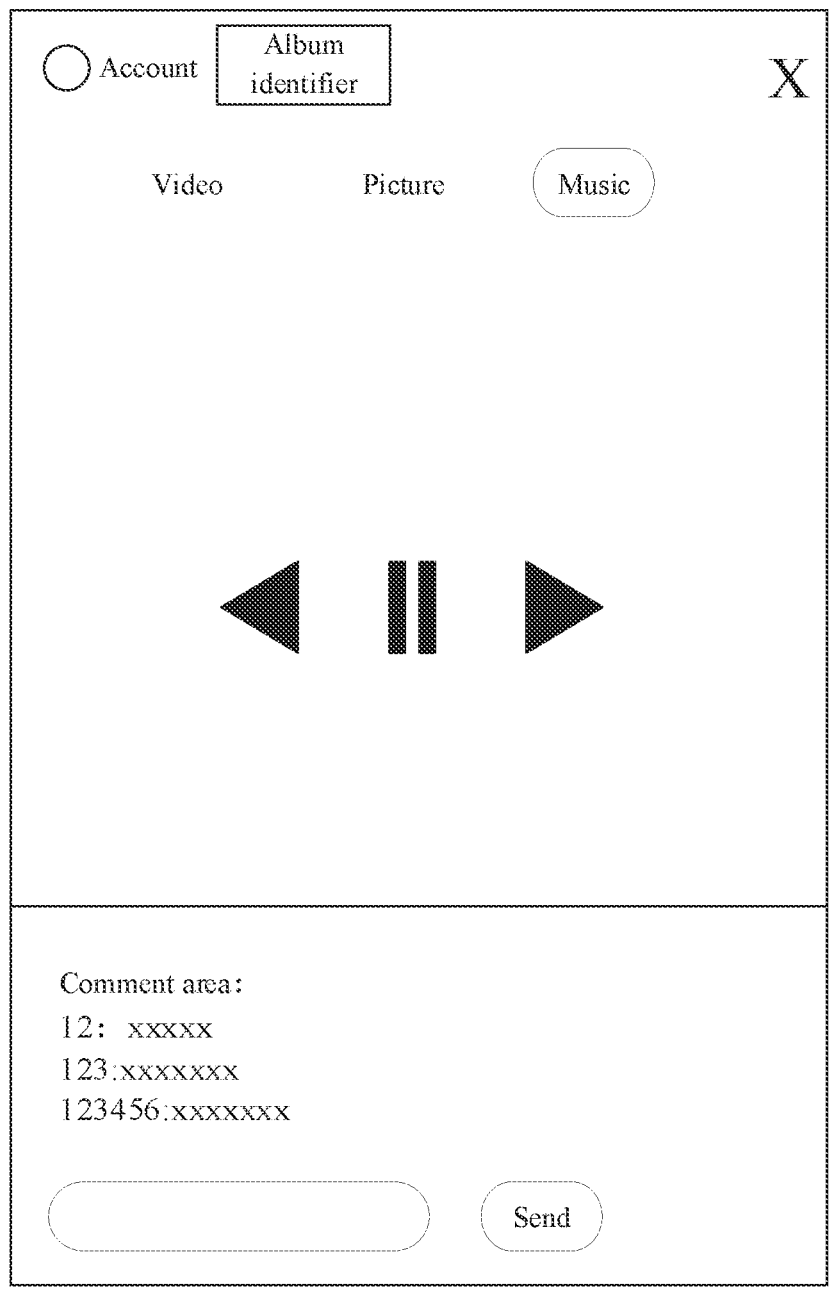
FIG. 3 is a schematic diagram of an album interface according to an embodiment of the present disclosure.

To play a digital album, the user may first launch the music player on the mobile phone to enter a monitoring interface, which displays a prompt message "Please turn on a peripheral card," as shown in FIG. 2; then the user may tap a switch of the peripheral card to turn on the peripheral card, and play audio data over the peripheral card. The music player receives the audio data, converts the audio data into digital information and sends the digital information to the server. Upon receiving the digital information, the server verifies the digital information, and sends the digital album to the mobile phone upon verification. In the case that the mobile phone receives the digital album, the music player automatically jumps to an album interface, as shown in FIG. 3. The user may send comments in the album interface with an account bound to the peripheral card and may download pictures in the digital album, and for the bound account, a unique identifier of the digital album may be added at a position, where the account is displayed, in all interfaces.

Figure 4:
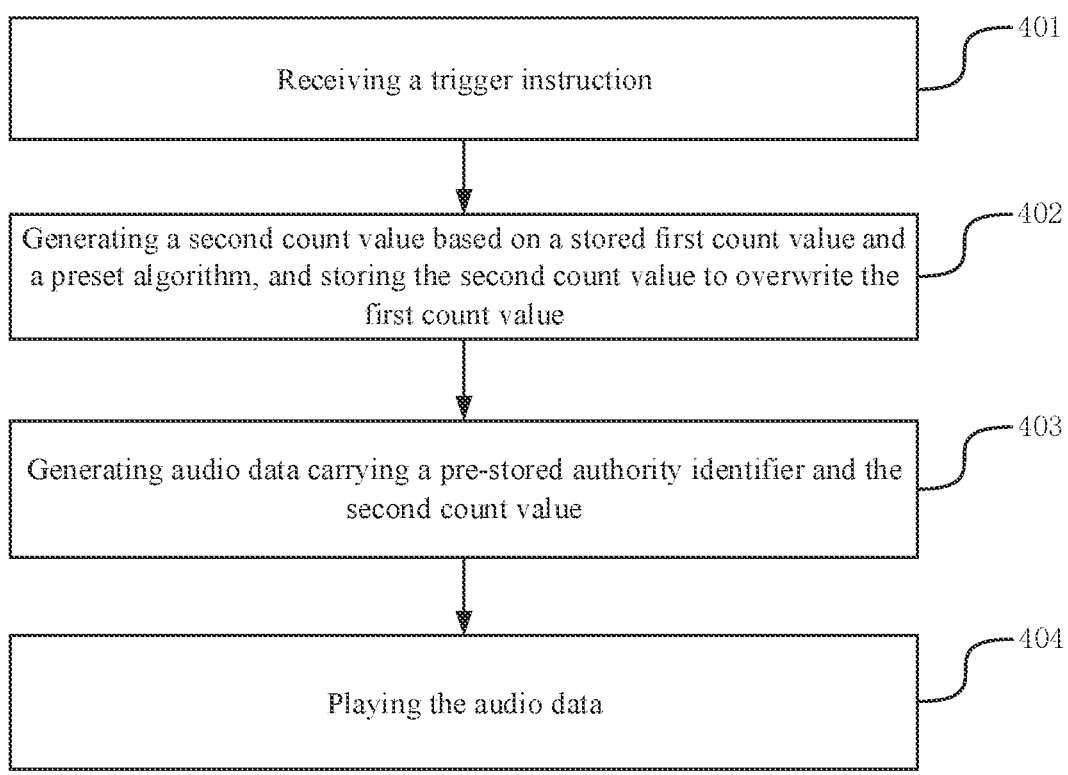
FIG. 4 is a flowchart of a method for playing media data at a first terminal according to an embodiment of the present disclosure.

FIG. 4 is a flowchart of a method for playing media data at a first terminal according to an embodiment of the present disclosure. Referring to FIG. 4, this embodiment includes following steps.

In step 401, the first terminal receives a trigger instruction.

In step 402, the first terminal generates a second count value based on a stored first count value and a preset algorithm, and the second count value is stored to overwrite the first count value, wherein the second count value is different from the first count value.

In step 403, the first terminal generates audio data carrying a pre-stored authority identifier and the second count value.

In step 404, the first terminal plays the audio data, wherein the audio data is configured to instruct a second terminal to acquire the authority identifier and the second count value carried in the audio data, and send the authority identifier and the second count value to the server. The second terminal is a terminal that has received the audio data.

Figure 5:
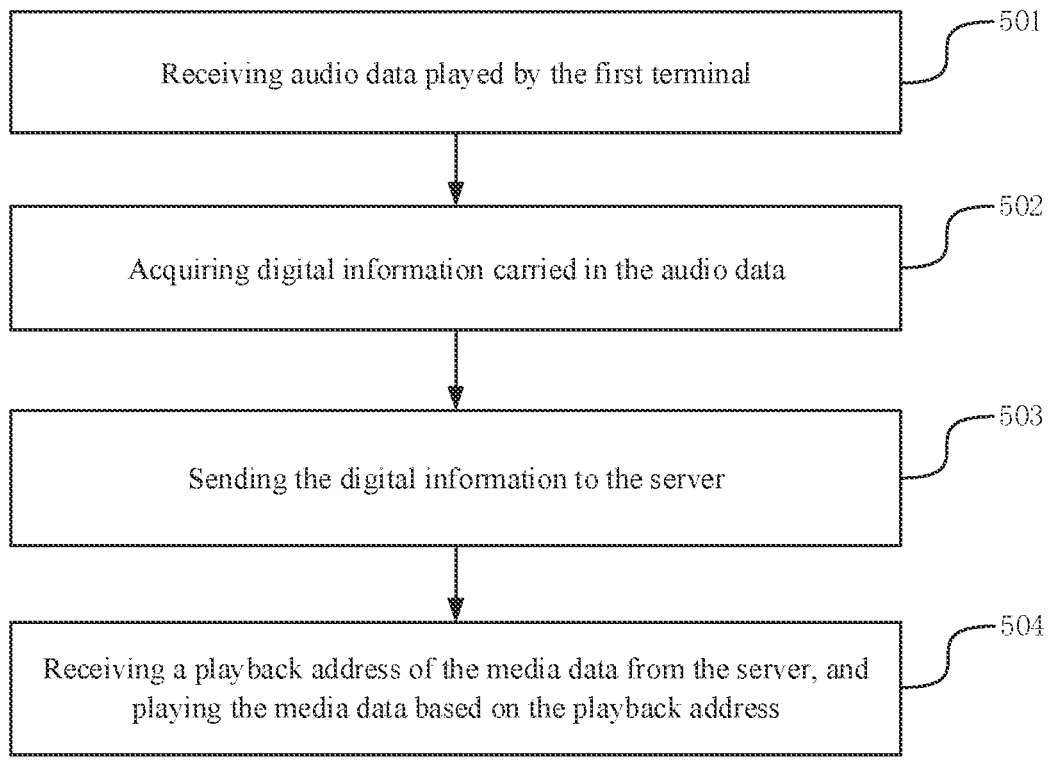
FIG. 5 is a flowchart of a method for playing media data at a second terminal according to an embodiment of the present disclosure.

FIG. 5 is a flowchart of a method for playing media data at a second terminal according to an embodiment of the present disclosure. Referring to FIG. 5, this embodiment includes following steps.

In step 501, the second terminal receives audio data played by a first terminal.

In step 502, the second terminal acquires digital information carried in the audio data, wherein the digital information includes an authority identifier and a second count value.

In step 503, the second terminal sends the digital information to a server.

In step 504, the second terminal receives a playback address of the media data from the server, and plays the media data based on the playback address.

Figure 6:
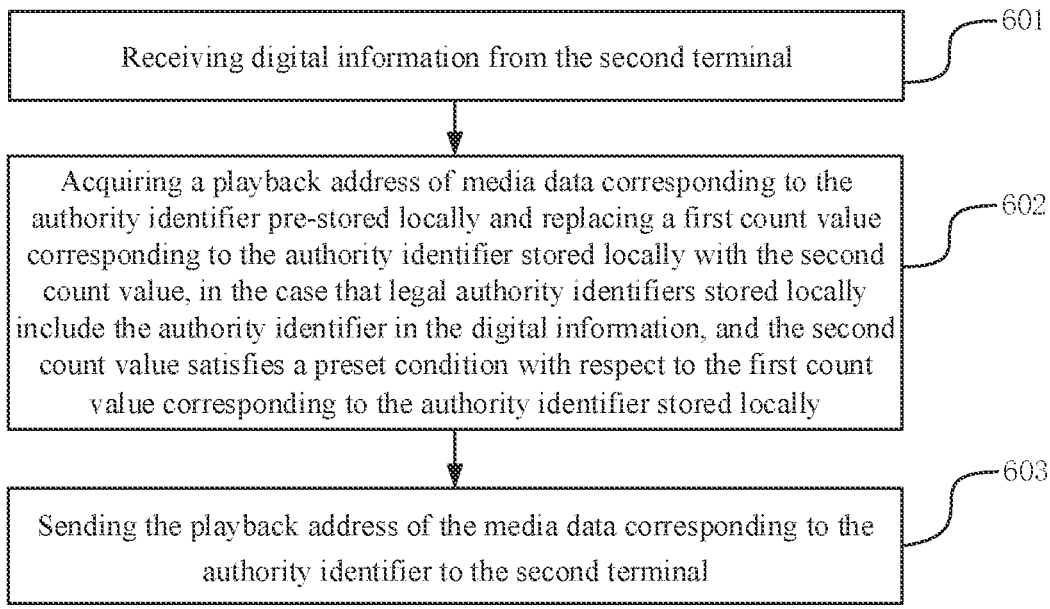
FIG. 6 is a flowchart of a method for playing media data at a server according to an embodiment of the present disclosure.

FIG. 6 is a flowchart of a method for playing media data at a server according to an embodiment of the present disclosure. Referring to FIG. 6, this embodiment includes following steps.

In step 601, the server receives digital information from a second terminal, wherein the digital information includes an authority identifier and a second count value.

In step 602, the server acquires a playback address of media data corresponding to the authority identifier pre-stored locally and replaces a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally.

In step 603, the server sends the playback address of the media data corresponding to the authority identifier to the second terminal.

Figure 7:
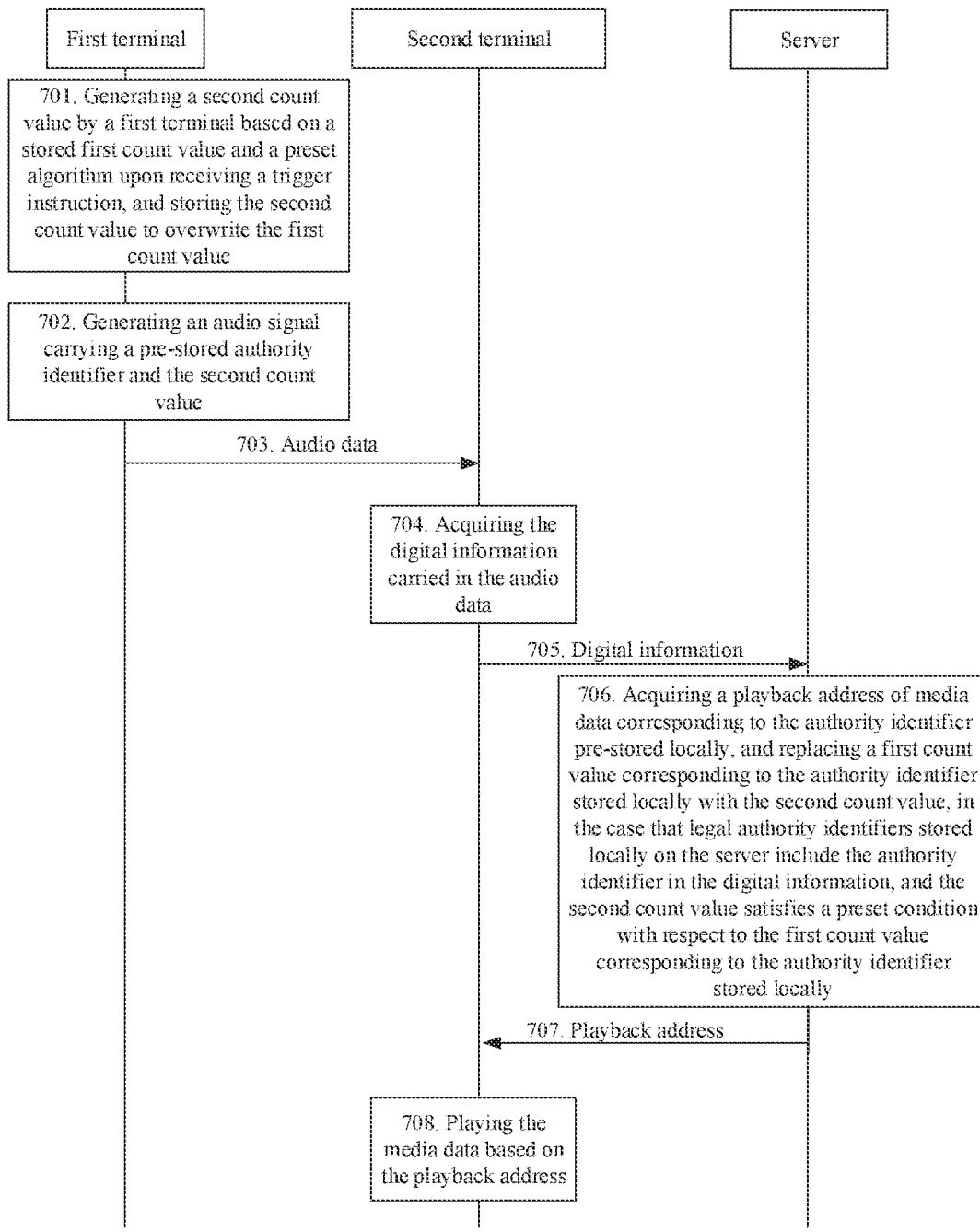
FIG. 7 is a flowchart of interaction between a server and terminals in a method for playing media data according to an embodiment of the present disclosure.

FIG. 7 is a flowchart of the interaction between a server and terminals in a method for playing media data according to an embodiment of the present disclosure. Referring to FIG. 7, this embodiment includes following steps:

In step 701, upon receiving a trigger instruction, a first terminal generates a second count value based on a stored first count value and a preset algorithm, and stores the second count value to overwrite the first count value.

The second count value is different from the first count value.

In practice, the user taps or clicks the switch of the peripheral card to power up the peripheral card. The peripheral card inputs an internally pre-stored first count value into a function of adding a preset increment value for calculation, and acquires the second count value. For example, the first count value is 0, the preset increment value is 1, when the first count value 0 is input into the function, the second count value 1 is acquired upon operation of the function, and then the acquired second count value is stored to overwrite the first count value.

In step 702, the first terminal generates audio data carrying a pre-stored authority identifier and the second count value.

The peripheral card generates the audio data by a conversion function. Corresponding processes may include: the peripheral card first acquires digital information, which may include an authority identifier and a second count value; then the peripheral card converts the digital information into binary code, which may be the ASCII code; and the peripheral card acquires the audio data by converting the digital information in the form of binary code into a sequence of audio frequencies, based on pre-stored audio frequencies corresponding to different digital codes. Each audio frequency used above is a mid-range audio frequency of 18 kHz to 22 kHz. The digital information may also include a digest value, sequence information, an error correction code, etc., which will be described in detail in the following content.

In practice, the peripheral card first generates a digest value based on the pre-stored authority identifier, the second count value and a pre-stored key, which may include following steps:

First, the peripheral card first calculates an initial digest value, and this step may be performed with the SHA256 algorithm. Specifically, the peripheral card inputs the authority identifier, the second count value, and the pre-stored key into the SHA256 algorithm, to acquire an initial digest value of 32 bits.

Second, the peripheral card shortens the calculated initial digest value to a digest value of a uniform preset length, and this step may be performed with the MD5 message digest algorithm. Specifically, the peripheral card inputs the initial digest value acquired in the above step into the MD5 message digest algorithm, to acquire a digest value with a preset length of 16 bits.

Third, the peripheral card randomly sorts the digest value, the second count value, and the authority identifier, and generates corresponding sequence information, which may be performed as follows:

Upon acquiring the digest value, the peripheral card stores three strings to be processed, namely the digest value, the second count value, and the authority identifier. The three strings to be processed are randomly sorted to generate a sending queue to be finally input into the conversion function, and the arrangement sequence of each string in the sending queue is recorded as another string, that is, the sequence information.

Fourth, the peripheral card generates an error correction code based on a target string finally composed of the four strings, i.e., the digest value, the second count value, the authority identifier and the sequence information, and inserts the error correction code into a specified position in the target string. The error correction code here may be the Hamming error correction code.

In step 703, the first terminal externally plays the audio data.

In practice, the peripheral card plays the audio data in the range of 18 kHz to 22 kHz, which is inaudible to the human ear, through a speaker on its device, to minimize the impact of noise in the environment on audio information.

In step 704, the second terminal acquires the digital information carried in the audio data.

The digital information includes the authority identifier and the second count value. The digital information may further include the digest value and sequence information, and may further include the error correction code.

In practice, the user launches the music player in the mobile phone to log in an account, and then enters the monitoring interface, such that the music player enters the monitoring state; and where the peripheral card plays the audio data, the music player acquires audio data by recording the received sequence of audio frequencies, converts the sequence of audio frequencies into digital information based on pre-stored digital codes corresponding to different audio frequencies, and sends the digital information and the locally logged-in account to the server. In the case that the digital information includes an error correction code, an error correction process may be performed based on the error correction code to acquire error-corrected digital information, i.e., a corrected target string without the error correction code inserted, and this digital information and the locally logged-in account are sent to the server. Alternatively, the error correction process may not be performed in the mobile phone, but may be performed by the server.

In step 705, the server receives the digital information from the second terminal.

In practice, the digital information is sent to the server.

First, the server receives the digital information and account from the mobile phone. The server first extracts the account from all the received contents, and the remaining contents are the digital information.

Second, in the case that the digital information includes an error correction code, an error correction process may be performed based on the error correction code to acquire error-corrected digital information, that is, a corrected target string without the error correction code inserted.

In step 706, in the case that legal authority identifiers stored locally on the server include the authority identifier in the digital information, and the second count value satisfies a preset condition with respect to a first count value corresponding to the authority identifier stored locally, the server acquires a playback address of media data corresponding to the pre-stored authority identifier, and replaces the first count value corresponding to the authority identifier stored locally with the second count value.

The preset condition is set prior to process.

In practice, the server may acquire the corrected string upon error correction, acquire the sequence information in this string (the sequence information is at the front or end of the string), and acquire the digest value, the second count value, and the authority identifier according to the sequence information. The server verifies these three strings respectively: first verifies whether the authority identifier is a correct authority identifier, then verifies whether the second count value of the terminal is greater than the first count value of the server, and finally verifies whether the digest value is the same as that calculated by the server. Corresponding processes will be described in detail in the following content.

Upon verification, whether the peripheral card is genuine, whether the audio data is correct audio data, and whether the key is a correct key may be determined. Upon completion of determination, the server checks whether the authority identifier in a list stored in a database is bound to an account. In the case that no account is bound, the corresponding peripheral card is used for the first time. In this case, the account sent by the mobile phone is bound to the authority identifier, that is, the account is added to a corresponding position in the list shown in FIG. 8, and the second count value of the terminal is assigned to the first count value of the server. At the same time, the server may acquire the sales volume of the digital album based on the number of authority identifiers that have been bound to accounts. The server may also increase the sales volume of the digital album by one when the account is bound to the authority identifier.

In step 707, the server sends the playback address of the media data corresponding to the authority identifier to the second terminal.

In practice, upon completion of the operations, the server sends the play address of the digital album corresponding to the authority identifier in the list to the mobile phone. In the case that the authority identifier sent by the mobile phone has been bound to the account, the corresponding peripheral card is not used for the first time, then no binding processing is required, and the playback address of the digital album corresponding to the authority identifier is directly sent to the mobile phone.

In step 708, the second terminal receives the playback address of the media data from server, and plays the media data based on the playback address.

In practice, in the case that the mobile phone receives the playback address of the digital album, the music player may directly access the playback address to display an album interface. At this time, in the case that the account logged in on the mobile phone is an account bound to the authority identifier, a unique identifier of the digital album may be displayed below the account, and the user may perform operations such as commenting, downloading pictures, and playing digital albums in the album interface with the account. In the case that the account logged in on the mobile phone is not an account bound to the authority identifier, the user may only play the digital album with the account, and may not perform operations such as commenting and downloading pictures with the account.

FIG. 9 is a flowchart of authority verification by the server in a method for playing media data according to an embodiment of the present disclosure. Referring to FIG. 9, this embodiment includes following steps.

In step 901, the server determines whether legal authority identifiers stored by the server include the authority identifier in the digital information.

In practice, the server checks authority identifiers in the list, and determines whether the list contains the same authority identifier as the authority identifier sent by the second terminal. In the case that it is determined that the list contains the same authority identifier, further verification is performed.

In step 902, the server compares the second count value of the terminal with the first count value of the server.

In practice, in the database of the server, a table of correspondence between authority identifiers and count values may be established. The server queries a first count value stored in the database and corresponds to the authority identifier sent by the second terminal. Upon acquisition of the first count value, the first count value is compared with the second count value of the terminal. In the case that the first count value of the server is less than the second count value of the terminal, further verification is performed.

In step 903, the server generates a digest value based on the authority identifier, the second count value in the digital information and a pre-stored key.

In practice, firstly, the server calculates an initial digest value of the server, and this step may be performed with the SHA256 algorithm. Specifically, the list is queried based on the authority identifier to acquire the key of the server, and then the authority identifier, the second count value of the terminal and the key of the server are input into the SHA256 algorithm, to acquire an initial digest value of 32 bits of the server.

Secondly, the server shortens the calculated initial digest value of the server to a digest value of a uniform preset length, and this step may be performed with the MD5 message digest algorithm. Specifically, the initial digest value acquired in the above step is input into the MD5 message digest algorithm, to acquire a digest value with a preset length of 16 bits of the server.

In step 904, the server determines whether the generated digest value of the server is the same as the digest value sent by the second terminal.

In practice, the acquired digest value of the server is compared with the acquired digest value sent by the second terminal, and in the case that the digest values are the same, the verification is completed. Further, the server may send the playback address of the media data corresponding to the authority identifier sent by the second terminal to the second terminal.

In the case that a verification result of any one of the above steps is negative, the server may send a notification that the digital album may not be acquired to the second terminal.

In the embodiments of the present disclosure, the digital information transmitted by the first terminal to the second terminal through the audio data includes a constantly changing count value in addition to the authority identifier. In this way, a count value in audio data acquired by recording is a count value that has been used, that is, it has not changed from the original count value. In verification of the count value, the server may send the playback address of the media data to the terminal only when the count value meets a change condition. Therefore, the media data can be prevented from being pirated by recording.

All the above optional technical solutions may be combined arbitrarily to form optional embodiments of the present disclosure, which will not be repeated here.

Figure 10:
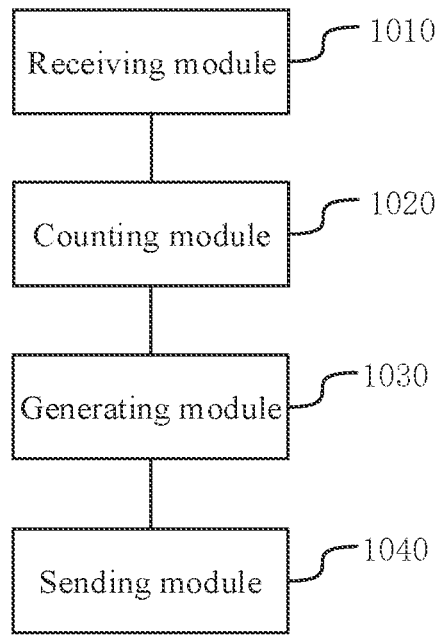
FIG. 10 is a schematic structural diagram of a first terminal in an apparatus for playing media data according to an embodiment of the present disclosure.

An embodiment of the present disclosure provides an apparatus for playing media data. The apparatus may be the first terminal in the above embodiments. As shown in FIG. 10, the apparatus includes:

a receiving module 1010, configured to receive a trigger instruction;

a counting module 1020, configured to generate a second count value based on a stored first count value and a preset algorithm, and store the second count value to overwrite the first count value, wherein the second count value is different from the first count value;

a generating module 1030, configured to generate audio data carrying a pre-stored authority identifier and the second count value; and a sending module 1040, configured to play the audio data, wherein the audio data is configured to instruct the second terminal to acquire the authority identifier and the second count value carried in the audio data, send the authority identifier and the second count value to the server, receive the playback address of the media data from the server, and play the media data based on the playback address, and the second terminal is a terminal that has received the audio data.

Optionally, the generating module 1030 is configured to:

generate a digest value based on a pre-stored authority identifier, the second count value and a pre-stored key; and generate audio data carrying the authority identifier, the second count value, and the digest value.

Optionally, the generating module 1030 is configured to:

randomly sort the digest value, the second count value, and the authority identifier, and generate corresponding sequence information; and generate audio data carrying the sequence information and the randomly sorted digest value, the second count value, and the authority identifier.

Optionally, the counting module 1020 is configured to:

generate the second count value by adding a preset increment value to the stored first count value.

Figure 11:
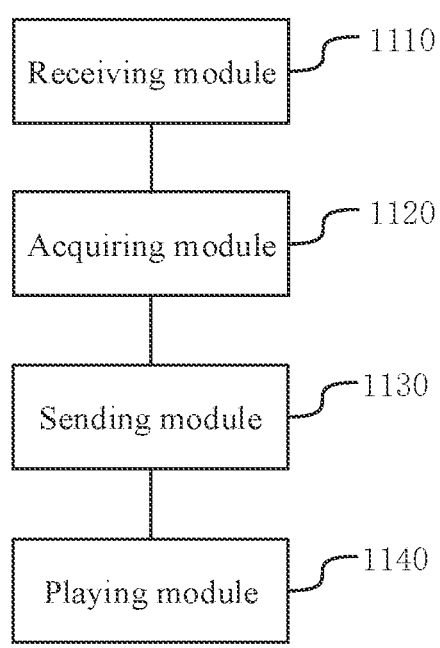
FIG. 11 is a schematic structural diagram of a second terminal in an apparatus for playing media data according to an embodiment of the present disclosure.

An embodiment of the present disclosure provides an apparatus for playing media data. The apparatus may be the second terminal in the above embodiments. As shown in FIG. 11, the apparatus includes:

a receiving module 1110, configured to receive audio data played by the first terminal.

an acquiring module 1120, configured to acquire digital information carried in the audio data, wherein the digital information includes an authority identifier and a second count value.

a sending module 1130, configured to send the digital information to the server.

a playing module 1140, configured to receive a playback address of the media data from the server, and play the media data based on the playback address.

Figure 12:
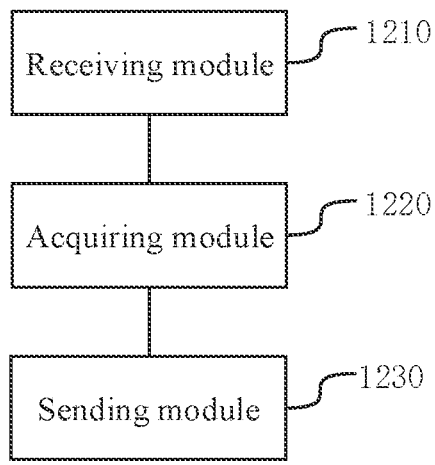
FIG. 12 is a schematic structural diagram of a server in an apparatus for playing media data according to an embodiment of the present disclosure.

An embodiment of the present disclosure provides an apparatus for playing media data. The apparatus may be the server in the above embodiments. As shown in FIG. 12, the apparatus includes:

a receiving module 1210, configured to receive digital information from the second terminal, wherein the digital information includes an authority identifier and a second count value.

an acquiring module 1220, configured to acquire a playback address of media data corresponding to the authority identifier pre-stored locally and replace a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally; and a sending module 1230, configured to send the playback address of the media data corresponding to the authority identifier to the second terminal.

Optionally, the digital information further includes a digest value, and the apparatus further includes:

a generating module, configured to generate a digest value based on the authority identifier, the second count value in the digital information and a pre-stored key; and a determining module, configured to determine that the generated digest value is the same as the digest value in the digital information.

Optionally, the digital information further includes sequence information, and the acquiring module 1220 is further configured to:

acquire the authority identifier, the second count value, and the digest value in the digital information based on the sequence information.

Optionally, that the second count value satisfies a preset condition with respect to the first count value corresponding to the authority identifier stored locally includes: the second count value being greater than the first count value.

In the embodiments of the present disclosure, the digital information transmitted by the first terminal to the second terminal through the audio data includes a constantly changing count value in addition to the authority identifier. In this way, a count value in audio data acquired by recording is a count value that has been used, that is, it has not changed from the original count value. When verifying the count value, the server may send the playback address of the media data to the terminal only when the count value meets a change condition. Therefore, the media data can be prevented from being pirated by recording.

It should be noted that with respect to playing media data by the apparatus for playing media data according to the above embodiments, description is given using a configuration of the functional modules as an example. In practice, the above functions may be implemented by different functional modules as required. That is, the apparatus may be internally divided into different functional modules to implement all or part of the functions described above. In addition, the apparatus for playing media data according to the above embodiments is based on the same concept as the method embodiments, and reference may be made to the method embodiments for the specific processes, which is not repeated herein.

An embodiment of the present disclosure further provides a system for playing media data, the system includes a first terminal, a second terminal, and a server.

The first terminal is configured to: receive a trigger instruction; generate a second count value based on a stored first count value and a preset algorithm, and store the second count value to overwrite the first count value, wherein the second count value is different from the first count value; generate audio data carrying a pre-stored authority identifier and the second count value; and play externally the audio data.

The second terminal is configured to: receive the audio data played by the first terminal; acquire digital information carried in the audio data, wherein the digital information includes the authority identifier and the second count value; send the digital information to the server; and receive a playback address of the media data from the server, and play the media data based on the playback address.

The server is configured to: receive the digital information from the second terminal; acquire a playback address of the media data corresponding to the authority identifier pre-stored locally and replace a first count value corresponding to the authority identifier stored locally with the second count value, in the case that legal authority identifiers stored locally include the authority identifier in the digital information, and the second count value satisfies a preset condition with respect to the first count value corresponding to the authority identifier stored locally; and send the playback address of the media data corresponding to the authority identifier to the second terminal.

Figure 13:
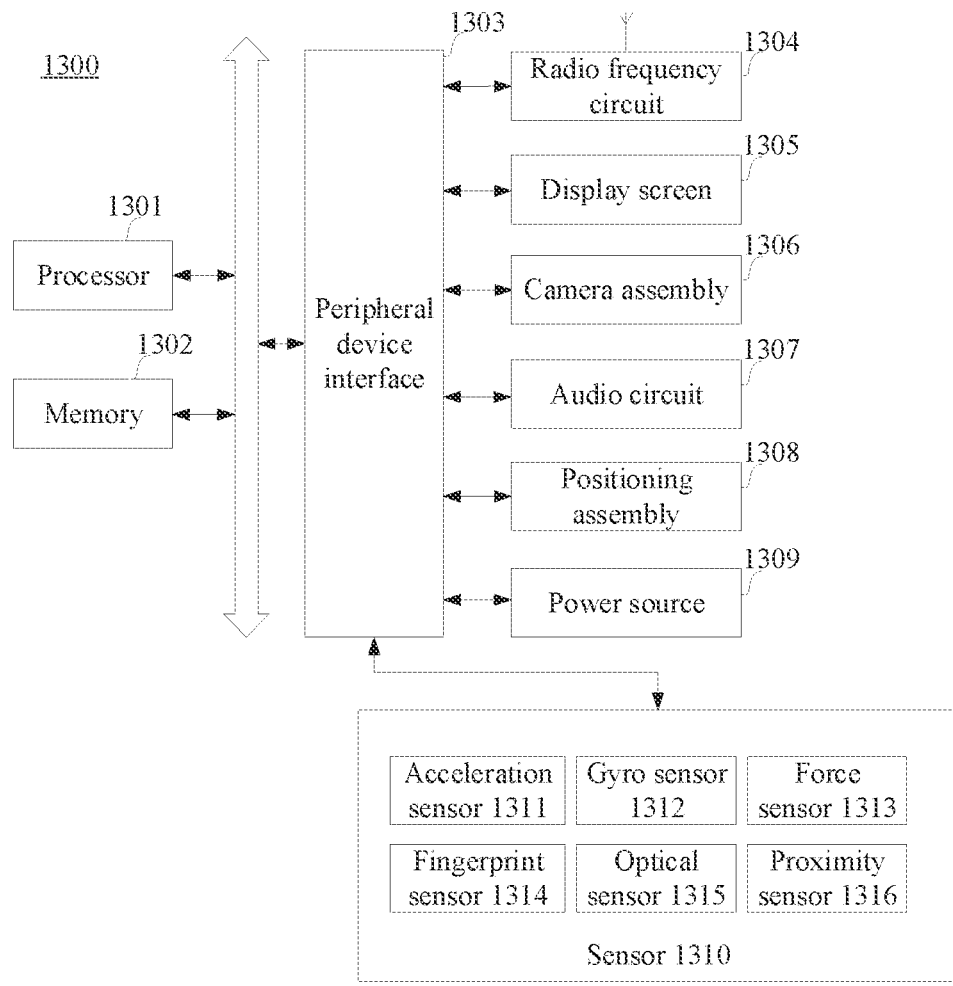
FIG. 13 is a schematic structural diagram of a terminal according to an embodiment of the present disclosure.

FIG. 13 is a structural block diagram of a terminal 1300 according to an exemplary embodiment of the present disclosure. The terminal 1300 may be the first terminal or the second terminal in the above embodiments. The terminal 1300 may be a smart mobile phone, a tablet computer, a Moving Picture Experts Group Audio Layer III (MP3) player, a Moving Picture Experts Group Audio Layer IV (MP4) player, a laptop or desk computer. The terminal 1300 may also be called a user equipment (UE), a portable terminal, a laptop terminal, a desk terminal, or the like.

Usually, the terminal 1300 includes a processor 1301 and a memory 1302.

The processor 1301 may include one or more processing cores, such as a 4-core processor and an 8-core processor. The processor 1301 may be formed by at least one hardware of a digital signal processor (DSP), a field-programmable gate array (FPGA), and a programmable logic array (PLA). The processor 1301 may also include a main processor and a coprocessor. The main processor is a processor for processing the data in an awake state, and is also called a central processing unit (CPU). The coprocessor is a low-power-consumption processor for processing the data in a standby state. In some embodiments, the processor 1301 may be integrated with a graphics processing unit (GPU), which is configured to render and draw the content that needs to be displayed by a display screen. In some embodiments, the processor 1301 may also include an Artificial Intelligence (AI) processor configured to process computational operations related to machine learning.

The memory 1302 may include one or more computer-readable storage mediums, which can be non-transitory. The memory 1302 may also include a high-speed random-access memory, as well as a non-volatile memory, such as one or more disk storage devices and flash storage devices. In some embodiments, the non-transitory computer-readable storage medium in the memory 1302 is configured to store at least one instruction. The at least one instruction is configured to be executed by the processor 1301 to perform the method for playing media data according to the method embodiments of the present disclosure.

In some embodiments, the terminal 1300 also optionally includes a peripheral device interface 1303 and at least one peripheral device. The processor 1301, the memory 1302, and the peripheral device interface 1303 may be connected by a bus or a signal line. Each peripheral device may be connected to the peripheral device interface 1303 by a bus, a signal line or a circuit board. Specifically, the peripheral device includes at least one of a radio frequency circuit 1304, a display screen 1305, a camera assembly 1306, an audio circuit 1307, a positioning assembly 1308, and a power source 1309.

The peripheral device interface 1303 may be configured to connect at least one peripheral device associated with an input/output (I/O) to the processor 1301 and the memory 1302. In some embodiments, the processor 1301, the memory 1302 and the peripheral device interface 1303 are integrated on the same chip or circuit board. In some other embodiments, any one or two of the processor 1301, the memory 1302 and the peripheral device interface 1303 may be implemented on a separate chip or circuit board, which is not limited in the present embodiment.

The radio frequency circuit 1304 is configured to receive and transmit a radio frequency (RF) signal, which is also referred to as an electromagnetic signal. The radio frequency circuit 1304 communicates with a communication network and other communication devices via the electromagnetic signal. The radio frequency circuit 1304 converts the electrical signal into the electromagnetic signal for transmission, or converts the received electromagnetic signal into the electrical signal. Optionally, the radio frequency circuit 1304 includes an antenna system, an RF transceiver, one or more amplifiers, a tuner, an oscillator, a digital signal processor, a codec chipset, a subscriber identity module card, and the like. The radio frequency circuit 1304 can communicate with other terminals via at least one wireless communication protocol. The wireless communication protocol includes, but not limited to, a metropolitan area network (MAN), various generations of mobile communication networks (2G, 3G, 4G, and 5G), a wireless local area network (LAN), and/or a wireless fidelity (Wi-Fi) network. In some embodiments, the RF circuit 1304 may also include near-field communication (NFC) related circuits, which is not limited in the present disclosure.

The display screen 1305 is configured to display a user interface (UI). The UI may include graphics, text, icons, videos, and any combination thereof. When the display screen 1305 is a touch display screen, the display screen 1305 also has the capacity to acquire touch signals on or over the surface of the display screen 1305. The touch signal may be input into the processor 1301 as a control signal for processing. At this time, the display screen 1305 may also be configured to provide virtual buttons and/or virtual keyboards, which are also referred to as soft buttons and/or soft keyboards. In some embodiments, one display screen 1305 may be disposed on the front panel of the terminal 1300. In some other embodiments, at least two display screens 1305 may be disposed respectively on different surfaces of the terminal 1300 or in a folded design. In further embodiments, the display screen 1305 may be a flexible display screen disposed on the curved or folded surface of the terminal 1300. Even the display screen 1305 may have an irregular shape other than a rectangle; that is, the display screen 1305 may be an irregular-shaped screen. The display screen 1305 may be prepared with materials such as liquid crystal display (LCD) and an organic light-emitting diode (OLED).

The camera assembly 1306 is configured to capture images or videos. Optionally, the camera assembly 1306 includes a front camera and a rear camera. Usually, the front camera is placed on the front panel of the terminal, and the rear camera is placed on the back of the terminal. In some embodiments, at least two rear cameras are disposed, and are at least one of a primary camera, a depth-of-field camera, a wide-angle camera, and a telephoto camera respectively, to implement a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera assembly 1306 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 1307 may include a microphone and a speaker. The microphone is configured to capture sound waves of users and environments, and convert the sound waves into electrical signals which are input into the processor 1301 for processing, or input into the RF circuit 1304 for voice communication. For the purpose of stereo acquisition or noise reduction, there may be a plurality of microphones respectively disposed at different locations of the terminal 1300. The microphone may also be an array microphone or an omnidirectional acquisition microphone. The speaker is then configured to convert the electrical signals from the processor 1301 or the radio frequency circuit 1304 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 1307 may also include a headphone jack.

The positioning assembly 1308 is configured to locate the current geographic location of the terminal 1300 to implement navigation or location-based service (LBS). The positioning assembly 1308 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 1309 is configured to power up various assemblies in the terminal 1300. The power source 1309 may be alternating current, direct current, a disposable battery, or a rechargeable battery. When the power source 1309 includes the rechargeable battery, the rechargeable battery may support wired recharging or wireless recharging. The rechargeable battery may also support the fast charging technology.

In some embodiments, the terminal 1300 also includes one or more sensors 1310. The one or more sensors 1310 include, but not limited to, an acceleration sensor 1311, a gyro sensor 1312, a force sensor 1313, a fingerprint sensor 1314, an optical sensor 1315 and a proximity sensor 1316.

The acceleration sensor 1311 may detect magnitudes of accelerations on three coordinate axes of a coordinate system established by the terminal 1300. For example, the acceleration sensor 1311 may be configured to detect components of a gravitational acceleration on the three coordinate axes. The processor 1301 may control the touch display screen 1305 to display a user interface in a landscape view or a portrait view according to a gravity acceleration signal captured by the acceleration sensor 1311. The acceleration sensor 1311 may also be configured to capture motion data of a game or a user.

The gyro sensor 1312 can detect a body direction and a rotation angle of the terminal 1300, and can cooperate with the acceleration sensor 1311 to capture a 3D motion of the user on the terminal 1300. Based on the data captured by the gyro sensor 1312, the processor 1301 can serve the following functions: motion sensing (such as changing the UI according to a user's tilt operation), image stabilization during shooting, game control and inertial navigation.

The force sensor 1313 may be disposed on a side frame of the terminal 1300 and/or a lower layer of the touch display screen 1305. When the force sensor 1313 is disposed on the side frame of the terminal 1300, a user's hold signal to the terminal 1300 can be detected. The processor 1301 can perform left-right hand recognition or quick operation according to the holding signal captured by the force sensor 1313. When the force sensor 1313 is disposed on the lower layer of the touch display screen 1305, the processor 1301 controls an operable control on the UI according to a user's press operation on the touch display screen 1305. The operable control includes at least one of a button control, a scroll bar control, an icon control, and a menu control.

The fingerprint sensor 1314 is configured to capture a user's fingerprint. The processor 1301 identifies the user's identity based on the fingerprint captured by the fingerprint sensor 1314, or the fingerprint sensor 1314 identifies the user's identity based on the captured fingerprint. When the user's identity is identified as trusted, the processor 1301 authorizes the user to perform related sensitive operations, such as unlocking the screen, viewing encrypted information, downloading software, paying, and changing settings. The fingerprint sensor 1314 may be provided on the front, back, or side of the terminal 1300. When the terminal 1300 is provided with a physical button or a manufacturer's logo, the fingerprint sensor 1314 may be integrated with the physical button or the manufacturer's logo.

The optical sensor 1315 is configured to capture ambient light intensity. In one embodiment, the processor 1301 may control the display luminance of the touch display screen 1305 according to the ambient light intensity captured by the optical sensor 1315. Specifically, when the ambient light intensity is high, the display luminance of the touch display screen 1305 is increased; and when the ambient light intensity is low, the display luminance of the touch display screen 1305 is decreased. In another embodiment, the processor 1301 may also dynamically adjust shooting parameters of the camera assembly 1306 according to the ambient light intensity captured by the optical sensor 1315.

The proximity sensor 1316, also referred to as a distance sensor, is usually disposed on the front panel of the terminal 1300. The proximity sensor 1316 is configured to capture a distance between the user and a front surface of the terminal 1300. In one embodiment, when the proximity sensor 1316 detects that the distance between the user and the front surface of the terminal 1300 becomes gradually smaller, the processor 1301 controls the touch display screen 1305 to switch from a screen-on state to a screen-off state. When it is detected that the distance between the user and the front surface of the terminal 1300 gradually increases, the processor 1301 controls the touch display screen 1305 to switch from the screen-off state to the screen-on state.

It will be understood by those skilled in the art that the structure shown in FIG. 13 does not constitute a limitation to the terminal 1300, and may include more or less assemblies than those illustrated, or combine some assemblies or adopt different assembly arrangements.

Figure 14:
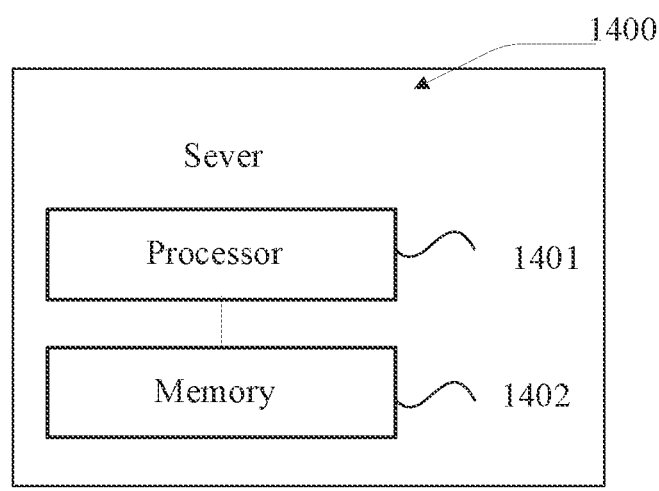
FIG. 14 is a schematic structural diagram of a server according to an embodiment of the present disclosure.

FIG. 14 is a schematic structural diagram of a server according to an embodiment of the present disclosure. Significant differences may be generated when the server 1400 has different configurations or performances. The server 1400 may include one or more processors (CPUs) 1401 and one or more memories 1402 stored with at least one instruction. The at least one instruction, when loaded and executed by the processor 1401, cause the processor 1401 to perform the method according to the foregoing method embodiments. The server may further include assemblies such as a wired or wireless network interface, a keyboard, and an input/output interface for input and output, and the server may further include other assemblies for implementing functions device, which is not repeated herein.

In an exemplary embodiment, there is also provided a computer-readable storage medium, such as a memory including instructions. The instructions can be executed by a processor in a terminal to perform the method for playing media data according to the above embodiments. For example, the above computer-readable storage medium may be a read-only memory (ROM), a random-access memory (RAM), a compact disc ROM (CD-ROM), a magnetic tape, a floppy disc, an optical data storage device, or the like.

Persons of ordinary skill in the art can understand that all or part of the steps described in the above embodiments can be completed through hardware, or through relevant hardware instructed by applications stored in a non-transitory computer readable storage medium, for example, a read-only memory, a disk, a CD, or the like.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for playing media data, applicable to a first terminal, the method comprising:
receiving a trigger instruction;
generating a second count value based on a stored first count value and a preset algorithm, and storing the second count value to overwrite the first count value, wherein the second count value is different from the first count value;
generating a first digest value based on a pre-stored authority identifier, the second count value, and a pre-stored key;
generating audio data carrying the first digest value, the authority identifier, and the second count value; and
playing the audio data, wherein the audio data is configured to instruct a second terminal to acquire the first digest value, the authority identifier and the second count value carried in the audio data, and send digital information comprising the first digest value, the authority identifier and the second count value to a server, such that the server performs the following:
calculating a second digest value based on the authority identifier, the second count value in the digital information, and a pre-stored key in the server; and in response to determining that the second digest value is the same as the first digest value in the digital information, legal authority identifiers stored locally in the server comprise the authority identifier in the digital information, and the second count value satisfies a preset condition with respect to the first count value corresponding to the authority identifier stored locally in the server, acquiring a pre-stored playback address of media data corresponding to the authority identifier and sending the playback address of the media data corresponding to the authority identifier to the second terminal,
wherein the second terminal is configured to acquire the audio data, acquire digital information, and play the media data based on the playback address.

2. The method according to claim 1, wherein generating the audio data carrying the authority identifier, the second count value, and the digest value comprises:
randomly sorting the digest value, the second count value, and the authority identifier, and generating corresponding sequence information; and
generating audio data carrying the sequence information, the randomly sorted digest value, the second count value, and the authority identifier.

3. The method according to claim 1, wherein generating the second count value based on the stored first count value and the preset algorithm comprises:
generating the second count value by adding a preset increment value to the stored first count value.

4. The method according to claim 2, wherein generating the second count value based on the stored first count value and the preset algorithm comprises:
generating the second count value by adding a preset increment value to the stored first count value.

5. A method for playing media data, applicable to a second terminal, the method comprising:
receiving audio data played by a first terminal, wherein the audio data carries a first digest value, an authority identifier pre-stored by the first terminal, and a second count value, the first digest value being generated by the first terminal based on the pre-stored authority identifier, the second count value, and a pre-stored key;
acquiring digital information carried in the audio data, wherein the digital information comprises the first digest value, the authority identifier and the second count value;
sending the digital information to a server, wherein the server is configured to perform the following:
calculating a second digest value based on the authority identifier, the second count value in the digital information, and a pre-stored key in the server; and in response to determining that the second digest value is the same as the first digest value in the digital information, legal authority identifiers stored locally in the server comprise the authority identifier in the digital information, and the second count value satisfies a preset condition with respect to the first count value corresponding to the authority identifier stored locally in the server, acquiring a pre-stored playback address of media data corresponding to the authority identifier and sending the playback address of the media data corresponding to the authority identifier to the second terminal; and receiving the playback address of the media data from the server, and playing the media data based on the playback address.

6. A method for playing media data, applicable to a server, the method comprising:

receiving digital information from a second terminal, wherein the digital information comprises a first digest value, an authority identifier and a second count value, wherein the digital information is acquired by the second terminal from audio data upon the second terminal receiving the audio data played by a first terminal, and the first digest value is generated by the first terminal based on a pre-stored authority identifier, the second count value, and a pre-stored key;

calculating a second digest value based on the authority identifier, the second count value in the digital information, and a pre-stored key in the server;

acquiring a playback address of media data corresponding to the authority identifier pre-stored locally and replacing a first count value corresponding to the authority identifier stored locally with the second count value, in the case that the second digest value is the same as the first digest value, legal authority identifiers stored locally in the server comprise the authority identifier in the digital information, and the second count value satisfies a preset condition with respect to the first count value corresponding to the authority identifier stored locally; and sending the playback address of the media data corresponding to the authority identifier to the second terminal.

7. The method according to claim 6, wherein the digital information further comprises sequence information configured to record a sequence of the authority identifier, the second count value, and the digest value in the digital information, and prior to generating the digest value based on the authority identifier, the second count value in the digital information, and the pre-stored key, the method further comprises:

acquiring the authority identifier, the second count value, and the digest value in the digital information based on the sequence information.

8. The method according to claim 6, wherein that the second count value satisfies a preset condition with respect to the first count value corresponding to the authority identifier stored locally comprises: the second count value being greater than the first count value.

9. The method according to claim 7, wherein that the second count value satisfies a preset condition with respect to the first count value corresponding to the authority identifier stored locally comprises: the second count value being greater than the first count value.

10. A terminal, comprising a processor and a memory storing at least one instruction therein, wherein the at least one instruction, when loaded and executed by the processor, causes the processor to perform operations in the method for playing media data as defined in claim 1.

11. A non-transitory computer-readable storage medium storing at least one instruction therein, wherein the at least one instruction, when loaded and executed by a processor, causes the processor to perform operations in the method for playing media data as defined in claim 1.

12. A terminal, comprising a processor and a memory storing at least one instruction therein, wherein the at least one instruction, when loaded and executed by the processor, causes the processor to perform operations in the method for playing media data as defined in claim 5.

13. A server, comprising a processor and a memory storing at least one instruction therein, wherein the at least one instruction, when loaded and executed by the processor, causes the processor to perform operations in the method for playing media data as defined in claim 6.

14. A system for playing media data, comprising a first terminal, a second terminal, and a server; wherein the first terminal is the terminal as defined in claim 10;

the second terminal is configured to: receive the audio data played by the first terminal; acquire digital information carried in the audio data, wherein the digital information comprises the authority identifier and the second count value; send the digital information to the server; and receive a playback address of the media data from the server, and play the media data based on the playback address; and the server is configured to: receive the digital information from the second terminal; acquire a playback address of the media data corresponding to the authority identifier pre-stored locally and replace a first count value corresponding to the authority identifier stored locally with the second count value, in the case that legal authority identifiers stored locally comprise the authority identifier in the digital information, and the second count value satisfies a preset condition with respect to the first count value corresponding to the authority identifier stored locally; and send the playback address of the media data corresponding to the authority identifier to the second terminal.

* * * * *